US008923671B2

(12) United States Patent
Hung

(10) Patent No.: US 8,923,671 B2
(45) Date of Patent: Dec. 30, 2014

(54) OPTICAL COUPLING LENS AND OPTICAL COMMUNICATION APPARATUS WITH SAME

(71) Applicant: Hon Hai Precision Industry Co., Ltd., New Taipei (TW)

(72) Inventor: Yi Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 83 days.

(21) Appl. No.: 13/855,734

(22) Filed: Apr. 3, 2013

(65) Prior Publication Data
US 2014/0003768 A1   Jan. 2, 2014

(30) Foreign Application Priority Data

Jun. 29, 2012 (TW) ................................ 101123566

(51) Int. Cl.
*G02B 6/32* (2006.01)
*G02B 5/04* (2006.01)
*G02B 6/42* (2006.01)
*G02B 6/34* (2006.01)

(52) U.S. Cl.
CPC ............... *G02B 6/32* (2013.01); *G02B 6/4286* (2013.01); *G02B 6/4214* (2013.01)
USPC ............................... 385/36; 385/33; 359/834

(58) Field of Classification Search
USPC ................................. 359/833–834; 385/33, 36
See application file for complete search history.

(56) References Cited

U.S. PATENT DOCUMENTS

| | | | | |
|---|---|---|---|---|
| 6,198,864 B1* | 3/2001 | Lemoff et al. | | 385/47 |
| 6,385,374 B2* | 5/2002 | Kropp | | 385/47 |
| 6,636,540 B2* | 10/2003 | Uebbing | | 372/36 |
| 6,751,379 B2* | 6/2004 | Capewell et al. | | 385/36 |
| 6,760,517 B2* | 7/2004 | Mine et al. | | 385/36 |
| 6,888,988 B2* | 5/2005 | Vancoille et al. | | 385/47 |
| 6,959,133 B2* | 10/2005 | Vancoill et al. | | 385/47 |
| 6,963,683 B2* | 11/2005 | Capewell | | 385/36 |
| 7,024,074 B2* | 4/2006 | Capewell | | 385/31 |
| 7,903,911 B2* | 3/2011 | Sekiya et al. | | 385/33 |
| 8,503,838 B2* | 8/2013 | Chen | | 385/31 |
| 8,724,944 B2* | 5/2014 | Kuznia et al. | | 385/33 |
| 8,787,714 B2* | 7/2014 | Morioka | | 385/33 |
| 8,787,715 B2* | 7/2014 | Hung | | 385/33 |
| 2003/0215234 A1* | 11/2003 | Mine et al. | | 398/41 |
| 2004/0062479 A1* | 4/2004 | Capewell | | 385/36 |
| 2004/0179784 A1* | 9/2004 | Vancoille et al. | | 385/47 |
| 2005/0147353 A1* | 7/2005 | Vancoill et al. | | 385/47 |
| 2011/0097037 A1* | 4/2011 | Kuznia et al. | | 385/33 |

(Continued)

*Primary Examiner* — Rhonda Peace
(74) *Attorney, Agent, or Firm* — Novak Druce Connolly Bove + Quigg LLP

(57) ABSTRACT

An optical coupling lens includes an incident surface, a first total reflection surface, a second total reflection surface and an emergent surface orderly connected to each other end to end. The incident surface includes a first lens portion and a second lens portion thereon. The emergent surface includes a third lens portion thereon. The third lens portion is positioned adjacent to the second total reflection surface. The first lens portion converges incident light into a parallel light beam. The first total reflection surface reflects the light beam to an intersection between the second total reflection surface and the emergent surface. The third lens portion directs the portion of the light beam to an optical fiber. The second total reflection surface reflects the other portion of the light beam to the second lens portion. The second lens portion directs the other portion of the light beam to an optical detector.

12 Claims, 1 Drawing Sheet

(56) References Cited

U.S. PATENT DOCUMENTS

| | | | |
|---|---|---|---|
| 2012/0063721 A1* | 3/2012 | Chen | 385/33 |
| 2012/0263416 A1* | 10/2012 | Morioka | 385/33 |
| 2012/0314996 A1* | 12/2012 | Yu et al. | 385/33 |
| 2013/0094026 A1* | 4/2013 | Kuznia et al. | 356/445 |
| 2013/0266260 A1* | 10/2013 | Morioka et al. | 385/33 |
| 2014/0003768 A1* | 1/2014 | Hung | 385/33 |
| 2014/0027624 A1* | 1/2014 | Hung | 250/227.11 |
| 2014/0099056 A1* | 4/2014 | Hung | 385/33 |
| 2014/0133802 A1* | 5/2014 | Morioka | 385/33 |
| 2014/0139836 A1* | 5/2014 | Hung | 356/432 |
| 2014/0145064 A1* | 5/2014 | Hung | 250/206 |
| 2014/0175268 A1* | 6/2014 | Hung | 250/227.11 |

\* cited by examiner

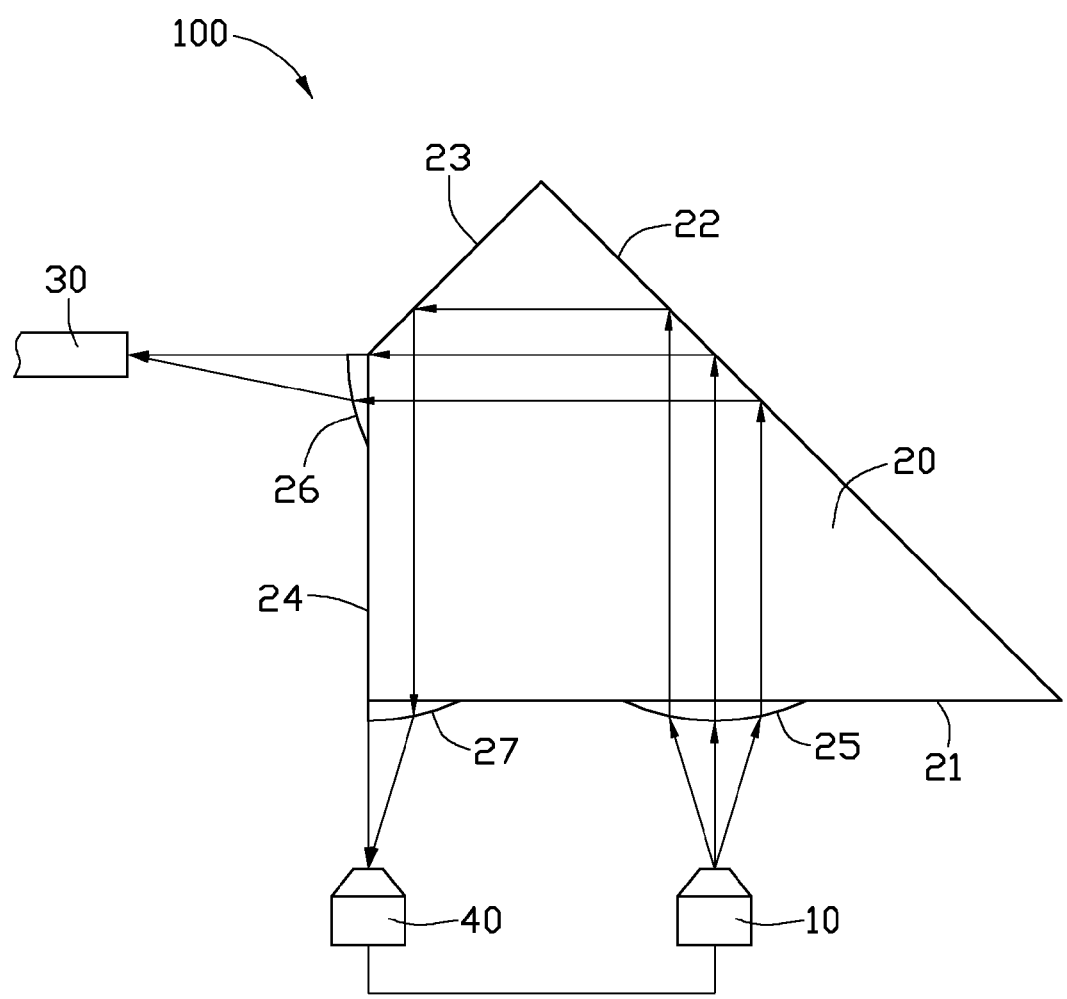

OPTICAL COUPLING LENS AND OPTICAL COMMUNICATION APPARATUS WITH SAME

BACKGROUND

1. Technical Field

The present disclosure relates to optical coupling lenses and optical communication apparatuses, and particularly to an optical lens and optical communication apparatus with optical signal feedback function.

2. Description of Related Art

An optical communication apparatus generally includes an optical signal emitting end for emitting optical signals and an optical signal receiving end for receiving the optical signals. The optical signal emitting end includes an optical signal emitter for emitting light containing optical signals, an optical fiber for transmitting the light therein, and an optical coupling lens for optically coupling optical signals between the optical signal emitter and the optical fiber. The light emitted from the optical signal emitter is directly coupled into the optical fiber by the optical coupling lens. However, one cannot know whether a quality of the light, such as an intensity or stability of the light, is satisfied under predetermined requirements. If the quality of the light is not satisfied, a transmitting efficiency and stability of the optical communication apparatus may be degraded accordingly.

What is needed therefore is an optical coupling lens and an optical communication apparatus with the optical coupling lens addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

The FIGURE is a schematic view of an optical communication apparatus according to an exemplary embodiment of the present disclosure.

DETAILED DESCRIPTION

FIG. 1 shows an optical communication apparatus 100 according to an exemplary embodiment. The optical communication apparatus 100 includes an optical signal emitter 10, an optical coupling lens 20, an optical fiber 30, and an optical detector 40 electrically connected to the optical signal emitter 10.

The optical signal emitter 10 is configured for generating optical signals and emitting light containing the optical signals. The optical signal emitter 10 can be a laser generator or other types of light source. In this embodiment, the optical signal emitter 10 is a vertical cavity surface emitting laser.

The optical coupling lens 20 is configured for splitting the light emitted from the optical signal emitter 10 into two portions, coupling one portion of the light into the optical fiber 30, and directing the other portion of the light to the optical detector 40. The optical coupling lens 20 includes an incident surface 21, a first total reflection surface 22, a second total reflection surface 23, and an emergent surface 24. The incident surface 21, the first total reflection surface 22, the second total reflection surface 23, and the emergent surface 24 are orderly connected to each other end to end. The incident surface 21 is substantially perpendicular to the emergent surface 24, and the first total reflection surface 22 is substantially perpendicular to the second total reflection surface 23. An included angle between the incident surface 21 and the first total reflection surface 22 is substantially 45 degrees. The optical coupling lens 20 further includes a first lens portion 25 and a second lens portion 27 formed on the incident surface 21, and a third lens portion 26 formed on the emergent surface 24. The first lens portion 25 is optically aligned with the optical signal emitter 10. The first lens portion 25 and the second lens portion 27 are spaced from each other, and the second lens portion 27 is positioned adjacent to the emergent surface 24. The third lens portion 26 is positioned adjacent to the second total reflection surface 23.

In this embodiment, the first lens portion 25, the second lens portion 27 and the third lens portion 26 are convex lenses. Alternatively, the first lens portion 25, the second lens portion 27 and the third lens portion 26 can be Fresnel lenses. In detail, the first lens portion 25 has a substantially crescent-shaped cross-section, and the second lens portion 27 and the third lens portion 26 both have a substantially semi-crescent shaped cross-section.

In this embodiment, the first lens portion 25 and the second lens portion 27 are both integrally formed with the incident surface 21, and the third lens portion 26 is integrally formed with the emergent surface 24.

The optical fiber 30 is positioned at a side of the optical coupling lens 20 which the emergent surface 24 faces toward, and an end of the optical fiber 30 is optically aligned with the third lens portion 26.

The optical detector 40 is positioned at a side of the optical coupling lens 20 which the incident surface 21 faces toward, and the optical detector 40 is optically aligned with the second lens portion 27. The optical detector 40 is configured for detecting the optical signals emitted from the optical signal emitter 10 and transmitting a detecting result to the optical signal emitter 10. In this embodiment, the optical detector 40 is a photodiode, and the optical detector 40 detects an intensity and stability of the optical signals.

In use, the optical signal emitter 10 converts electrical signals into corresponding optical signals and emits light containing the optical signals to the first lens portion 25 of the optical coupling lens 20; the first lens portion 25 converges the light into a substantially parallel light beam and directs the parallel light beam to the first total reflection surface 22; the first total reflection surface 22 reflects the parallel light beam to an intersection between the second total reflection surface 23 and the emergent surface 24; a portion of the parallel light beam is converged by the third lens portion 26 and projects to the optical fiber 30, and another portion of the parallel light beam is reflected to the second lens portion 27 by the second total reflection surface 23; the light beam reflected by the second total reflection surface 23 is converged by the second lens portion 27 and is projected on the optical detector 40; the optical detector 40 receives the light beam converged by the second lens portion 27, detects an intensity and stability of the light beam, and transmits a detecting result to the optical signal emitter 10; the optical signal emitter 10 adjusts the emitting light according to the detecting result. Therefore, parameters of the emitting light can be timely detected by the optical detector 40, and the performance of the optical communication apparatus 100 is ensured.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical coupling lens for optically coupling light between an optical signal emitter, an optical fiber and an optical detector, the optical coupling lens comprising:
an incident surface comprising a first lens portion and a second lens portion formed thereon;
a first total reflection surface;
a second total reflection surface; and
an emergent surface comprising a third lens portion formed thereon;
wherein the incident surface, the first total reflection surface, the second total reflection surface and the emergent surface are orderly connected to each other end to end, the third lens portion is positioned adjacent to the second total reflection surface, the first lens portion converges incident light into a parallel light beam, the first total reflection surface reflects the light beam to an intersection between the second total reflection surface and the emergent surface, the third lens portion converges a portion of the light beam and directs the converged light beam to the optical fiber, the second total reflection surface reflects the other portion of the light beam to the second lens portion, and the second lens portion converges the other portion of the light beam reflected by the second total reflection surface and directs the other portion of the light beam to the optical detector.

2. The optical coupling lens of claim 1, wherein the incident surface is substantially perpendicular to the emergent surface, the first total reflection surface is substantially perpendicular to the second total reflection surface, and an included angle between the incident surface and the first total reflection surface is substantially 45 degrees.

3. The optical coupling lens of claim 1, wherein the second lens portion is positioned adjacent to the emergent surface.

4. The optical coupling lens of claim 1, wherein the first lens portion, the second lens portion and the third lens portion are convex lenses.

5. The optical coupling lens of claim 4, wherein the first lens portion has a substantially crescent-shaped cross-section, and the second lens portion and the third portion both have a substantially semi-crescent shaped cross-section.

6. An optical communication apparatus, comprising:
an optical signal emitter for emitting light containing optical signals;
an optical fiber;
an optical detector; and
an optical coupling lens, comprising:
an incident surface comprising a first lens portion and a second lens portion formed thereon, the second lens portion being optically aligned with the optical detector;
a first total reflection surface;
a second total reflection surface; and
an emergent surface comprising a third lens portion formed thereon, the third lens portion being optically aligned with the optical fiber;
wherein the incident surface, the first total reflection surface, the second total reflection surface and the emergent surface are orderly connected to each other end to end, the third lens portion is positioned adjacent to the second total reflection surface, the first lens portion converges the light into a parallel light beam, the first total reflection surface reflects the light beam to an intersection between the second total reflection surface and the emergent surface, the third lens portion converges a portion of the light beam and directs the portion of the light beam to the optical fiber, the second total reflection surface reflects the other portion of the light beam to the second lens portion, and the second lens portion converges the other portion of the light beam reflected by the second total reflection surface and directs the other portion of the light beam to the optical detector.

7. The optical communication apparatus of claim 6, wherein the incident surface is substantially perpendicular to the emergent surface, the first total reflection surface is substantially perpendicular to the second total reflection surface, and an included angle between the incident surface and the first total reflection surface is substantially 45degrees.

8. The optical communication apparatus of claim 6, wherein the second lens portion is positioned adjacent to the emergent surface.

9. The optical communication apparatus of claim 6, wherein the first lens portion, the second lens portion and the third lens portion are convex lenses.

10. The optical communication apparatus of claim 9, wherein the first lens portion has a substantially crescent-shaped cross-section, and the second lens portion and the third portion both have a substantially semi-crescent shaped cross-section.

11. The optical communication apparatus of claim 6, wherein the optical signal emitter is a vertical cavity surface emitting laser.

12. The optical communication apparatus of claim 6, wherein the detector is a photodiode.

* * * * *